Figure 1:
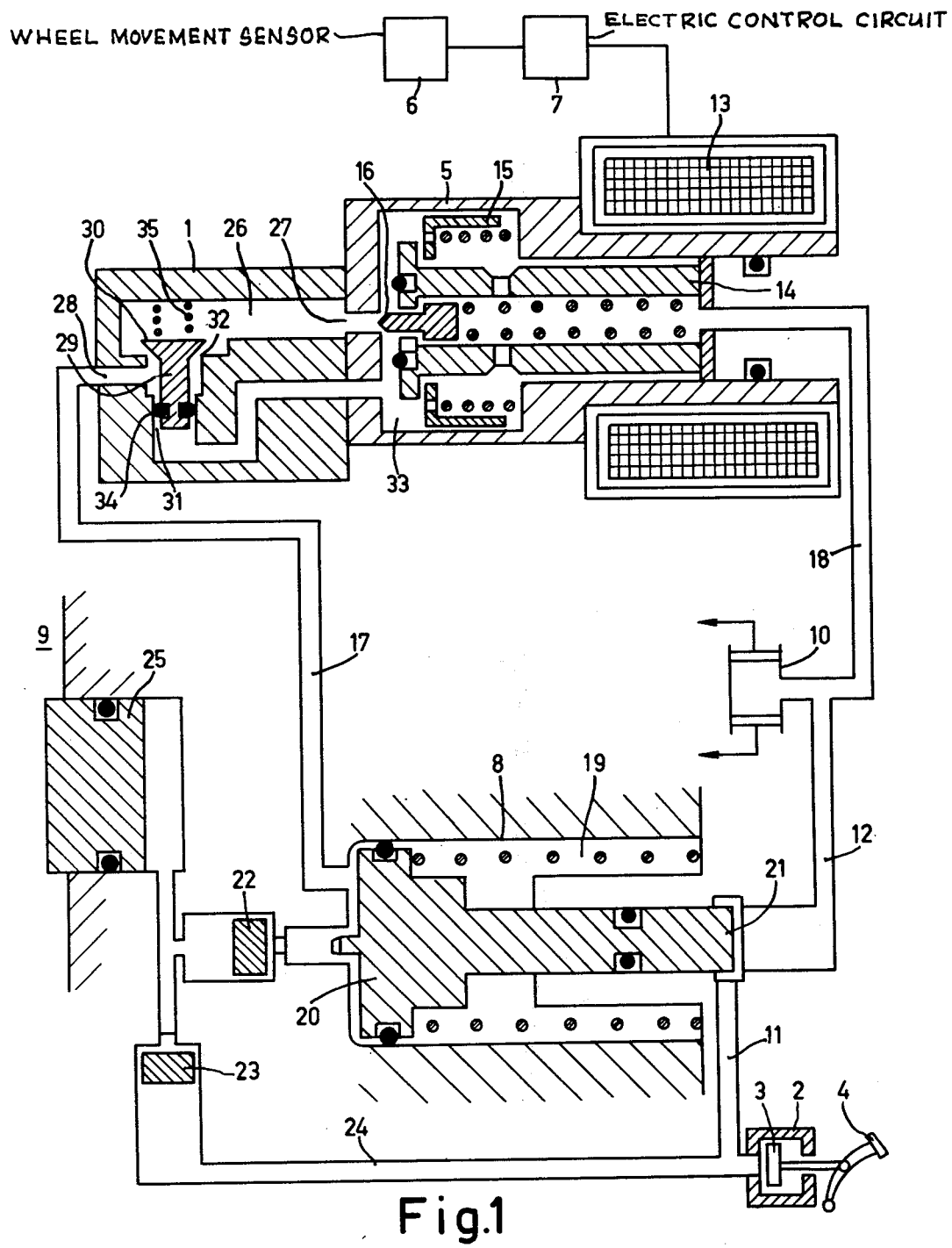

United States Patent [19]
Skoyles

[11] 3,881,782
[45] May 6, 1975

[54] ANTI-LOCK VEHICLE BRAKE SYSTEMS

[75] Inventor: Derek Robert Skoyles, Salfords, England

[73] Assignee: U.S. Philips Corporation, New York, N.Y.

[22] Filed: Sept. 10, 1973

[21] Appl. No.: 395,910

[30] Foreign Application Priority Data
Sept. 18, 1972 United Kingdom............... 43228/72

[52] U.S. Cl..................... 303/21 F; 251/25; 303/68
[51] Int. Cl............................ B60t 8/02; B60t 13/16
[58] Field of Search.......... 303/21 F, 21 AF, 61–63, 303/68–69; 188/181 A; 251/25, 23, 48, 47, 55

[56] References Cited
UNITED STATES PATENTS

| | | |
|---|---|---|
| 3,449,019 | 6/1969 | Walker............................ 303/21 AF |
| 3,503,655 | 3/1970 | Heimler........................... 303/21 AF |
| 3,524,684 | 8/1970 | Skoyles.............................. 303/21 F |
| 3,552,802 | 1/1971 | Packer et al. ...................... 303/21 F |
| 3,574,416 | 4/1971 | Skoyles.............................. 303/21 F |
| 3,743,363 | 7/1973 | Hodge et al. ....................... 303/21 F |
| 3,746,402 | 7/1973 | Hickner et al................. 188/181 A |
| 3,801,161 | 4/1974 | Sharp .................................. 303/21 F |

Primary Examiner—Trygve M. Blix
Assistant Examiner—D. C. Butler
Attorney, Agent, or Firm—Frank R. Trifari

[57] ABSTRACT

An anti-lock vehicle brake system including a failsafe arrangement for comparing the fluid pressure at the outlet side of the anti-lock control valve with the fluid pressure at a brake for adjusting the release of fluid pressure from the brake according to the available brake pressure.

4 Claims, 3 Drawing Figures

ANTI-LOCK VEHICLE BRAKE SYSTEMS

This invention relates to anti-lock brake systems for wheeled vehicles, that is, brake systems including means for improving braking performance of a vehicle by causing a decrease of the braking force applied to a road wheel of the vehicle if the wheel tends to lock, in a circumstance likely to produce an incipient skid condition, following brake application, said means then causing the braking force to be increased again without the need for any change in the actual braking action (by a person using the brake) causing the brake application. Such brake systems can be successful in reducing the risk of skidding due to wheel lock and in maintaining directional control during braking, and can also reduce braking distances.

The invention relates more particularly to a fluid-pressure operated anti-lock vehicle brake system of the character comprising, for use in conjunction with a vehicle wheel and associated wheel brake, a fluid pressure source which in response to a braking action provides fluid under pressure via a fluid pressure connection to the brake, said fluid under pressure being effective to produce braking pressure at the brake to cause the latter to apply a braking force at said wheel, an anti-lock control valve which is suitably a solenoid valve mechanism, wheel movement sensing means for producing an output signal for causing actuation of the anti-lock control valve when a predetermined relationship or criterion exists. This criterion is related to wheel rotational movement and signifies wheel locking is imminent. A relief connection interconnected with said fluid pressure connection or with the brake is opened by said anti-lock valve, when the latter is actuated, to allow displacement of fluid from said fluid pressure connection or from the brake into said relief connection. This causes reduction in braking pressure and thus a decrease of the applied braking force. A preferred criterion for causing actuation of the anti-lock control valve is when wheel slip exceeds a chosen value.

An anti-lock vehicle brake system of the above character may be either of the master cylinder type in which fluid in a master cylinder is pressurized by a piston, when a braking action takes place, to pressurize fluid in said fluid pressure connection, or of the continuously pumped type in which fluid under pressure is available continuously in the brake system and is "modulated" by a braking action such that the pressurised fluid is introduced into said fluid pressure connection to an extent determined by the extent of modulation. Also, the braking action causing operation of the master cylinder or of the brake modulator, as the case may be, may be with or without servo or amplifier assistance. Having regard to the above, the term "fluid pressure source" as used in this specification is to be construed accordingly.

The wheel movement sensing means can comprise a mechanical inertia sensor or the combination of a transducer for producing an electrical pulse train which is a function of wheel speed and an electronic control circuit for processing said electrical pulse train.

A separate system of the above character (with a common fluid pressure source) can be provided in respect of each road wheel of a vehicle, but it would also be possible to provide a single system for the two (rear) wheels driven by a vehicle transmission shaft with sensing means associated with the shaft for producing said output function. As another alternative, a single system may be provided in common for all the road wheels of a vehicle. In this case, each road wheel would have its own wheel movement sensing means and any of the latter would provide said output function to cause actuation of the anti-lock control valve when the appertaining wheel tended towards a locked condition.

Normally, in an anti-lock vehicle brake system of the above character, the period during which the anti-lock control valve is held actuated to reduce braking pressure is very short (i.e. only a small fraction of a second), and the anti-lock control valve is released at the end of the period to allow braking pressure to increase again. This normal anti-lock operation to reduce braking pressure and then to allow it to increase again is repeated each time the wheel tends towards a locked condition during a braking action.

This function of the anti-lock control valve to reduce braking pressure when it is actuated can introduce into the system a possible drawback in that if there is a malfunction causing the anti-lock control valve to be already actuated when initial brake application occurs, braking pressure might be unable to build-up sufficiently to achieve effective braking. Therefore, unless a fail-safe arrangement of some form is provided, which is effective in the event of such malfunction to inhibit the effect of the actuated anti-lock control valve, a brake failure would result at each normal brake application.

According to the present invention, there is provided an anti-lock vehicle brake system of the character referred to which includes in said relief connection at the outlet side of said anti-lock control valve a fail-safe arrangement for comparing the fluid pressure at the outlet side of the anti-lock control valve with the fluid pressure at the brake, the arrangement being such that:

a. if there is fluid flow at said outlet side due to the anti-lock control valve being at least partially unsealed at the onset of brake pressure application when the anti-lock control valve is unactuated, this results in a pressure build-up at said outlet side which causes the fail-safe arrangement to be responsive to seal said connection and thereby prevent displacement of fluid from said fluid pressure connection or from the brake through said relief connection; or b. if there is no fluid pressure build-up at said outlet side, because the anti-lock control valve is sealing correctly, at the onset of brake pressure application, said fail-safe arrangement is responsive to the fluid pressure at the brake to unseal said relief connection and thereafter maintain it unsealed notwithstanding subsequent build-up of fluid pressure at said outlet side due to any bone fide actuation of the anti-lock control valve.

A fail-safe arrangement according to the invention has a particular but non-exclusive application in anti-lock vehicle brake system of the character referred to which includes a fluid pressure control device of the form described commonly owned U.S. application Ser. No. 395,911 filed Sept. 10, 1973. The reason for this is that such a fluid pressure control device requires an associated fail-safe arrangement to be located at its outlet side in said relief connection.

Figure 2:
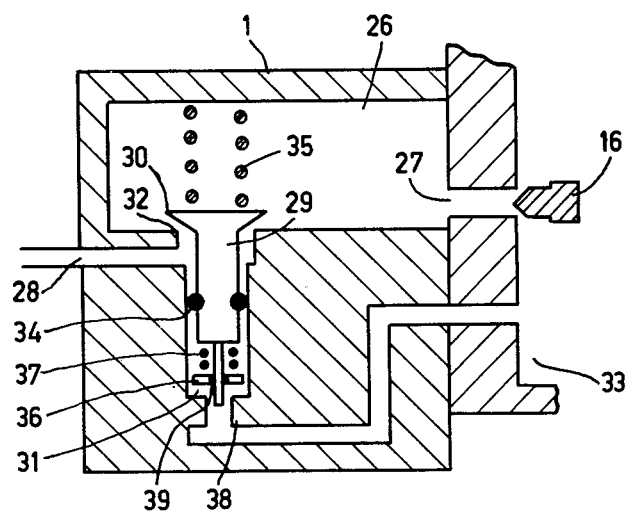
Figure 3:
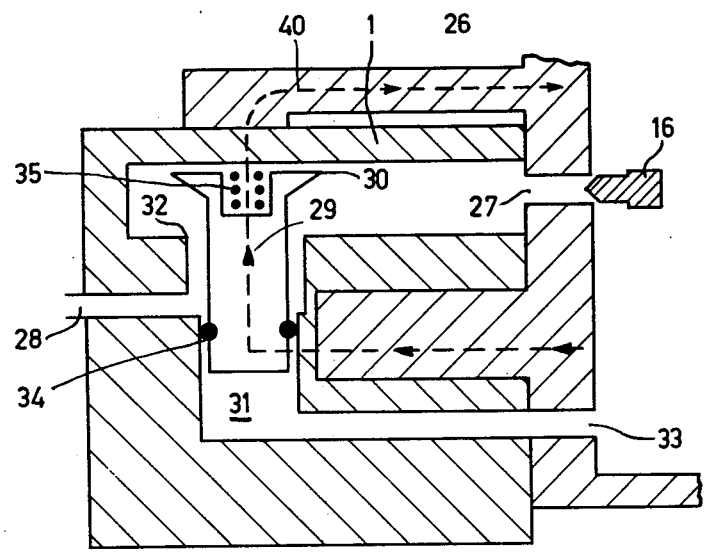

In order that the invention may be more fully understood reference will now be made by way of example to the drawings in which:

FIG. 1 shows diagrammatically a particular form of anti-lock vehicle brake system of the character referred to including a fail-safe arrangement in accordance with the invention; and FIGS. 2 and 3 show diagrammatically respective modifications of the fail-safe arrangement in FIG. 1.

Referring to the drawings, in FIG. 1 a fail-safe arrangement 1 is provided in a particular form of anti-lock vehicle brake system which is described in greater detail than herein in our U.K. patent No. 1,248,787, although the diagrammatic figure illustrating the system in that specification is drawn differently from the present FIG. 1. This system is a master cylinder type hydraulic system comprising a master cylinder 2 having a piston 3 which is actuable by a brake pedal 4. The system further comprises a solenoid valve mechanism 5 which constitutes an anti-lick control valve, a wheel movement sensor 6, an electronic control circuit 7, a fluid flow control arrangement 8, and a scavenging pump 9. A wheel brake 10, for a vehicle road wheel (not shown), is controlled by the system.

In operation of the system of FIG. 1, for normal brake application, fluid in pressure lines 11 and 12 is pressurised by the master cylinder 2 to an extent determined by a driver's braking action and this produces a corresponding braking pressure in the brake 10. If the driver's braking action causes the road wheel with which the brake 10 is associated to exceed a wheel slip of chosen value, this is detected by the wheel movement sensor 6 and the control circuit 7 and the latter energizes the solenoid valve mechanism 5. Details of the manner of operation and composition of the elements 6 and 7 are not thought to be necessary for an understanding of the present invention, but an example is given in commonly owned U.S. Pat. application U.S. Ser. No. 272,776 filed July 18, 1972 and Ser. No. 368,953 filed June 11, 1973. Another form of control circuit is described in our U.S. Pat. No. 3,710,186.

The solenoid valve mechanism 5 has an energising coil 13 which on energisation attracts an armature 14 to the right (as seen in the drawing) against the force of a spring 15 and the armature 14 carries with it a valve seal 16 which thus unseats from a fluid connection 17. Subsequent de-energization of the solenoid valve mechanism 5 will allow the valve seal 16 to reseal the connection 17 and that for the purposes of the present invention only this simple operation of the solenoid valve mechanism need be appreciated. A detailed description of this solenoid valve mechanism which comprises other features that form a separate invention is given in commonly owned U.S. patent application Ser. No. 366,307 filed June 1, 1973.

As a result of the energization of the solenoid valve mechanism 5, a fluid path is opened by the latter between the connection 17 and a relief connection 18 at the brake 10, so that fluid under pressure at the brake 10 is displaced through said relief connection 18 to the connection 17 (via the fail-safe arrangement 1 and the energised solenoid valve mechanism 5), thereby reducing braking pressure. This displaced fluid enters a reservoir 19 of the fluid flow control arrangement 8 where it is applied behind a spring-loaded piston 20 and displaces this piston 20 to the right (as seen in the drawing), so that the stem 21 of this piston enters the pressure line 12, thereby restricting flow of fluid through this line from the pressure line 11. Braking pressure is now reduced to an extent determined by the extent of displacement of the piston 20 to the right and thus to the volume of displaced fluid. For normal anti-lock operation the solenoid valve mechanism 5 remains energized for only the short time required to allow the braking pressure to fall sufficiently low for the wheel associated with the brake 10 to recover towards free-rolling speed. The pump 9, which comprises valves 22 and 23 returns fluid from the reservoir 19 of the fluid flow control arrangement 8 to the pressure line 11 via a connection 24. The pump 9 removes sufficient fluid from the reservoir 19 for the piston 20 to return under its spring-loading towards its original position, to increase progressively the rate of braking pressure build up. A pump piston 25 of the pump 9 can be driven by the road wheel associated with the brake 10 by means of a shallow cam that rotates with this wheel.

From the foregoing description it will be appreciated that if the solenoid valve mechanism 5 is already energized, due to a malfunction, and if a subsequent braking action takes place in the absence of a fail-safe protection, fluid needed in line 12 to produce braking pressure will be displaced through the energised solenoid valve mechanism with the result that, with the system as so far described, braking pressure could not build-up above a dangerously low value. In fact the highest value which the fluid pressure at the brake can reach in this circumstance is the value of the fluid pressure in the reservoir 19. In order to achieve a normal build-up or fluid pressure in the brake when such a malfunction occurs, the fail-safe arrangement 1 is provided.

The fail-safe arrangement 1 comprises a chamber 26 having an inlet port 27 communicating with the outlet side of a solenoid valve seal 16, and an outlet port 28 communicating with the connection 17. A plunger 29 having a conic seal 30 at one end extends into the chamber 26 from a bore 31. This conic seal 30 co-operates with an edge 32 in the wall of the chamber 26 to form a fluid seal at the outlet port 28. The bore 31 communicates at its end remote from the chamber 26 with a region 33 of the solenoid valve mechanism 5 (i.e. at the inlet side of the valve seal 16). An O-ring seal 34 is provided around the plunger 29, and a bias spring 35 for the plunger 29 is provided in the chamber 26. This bias spring 35 serves normally to bias the plunger 29 to a position in which the conic seal 30 and co-operating edge 32 form the fluid seal at the outlet port 28.

When the solenoid valve mechanism 5 is unenergised and assuming that the valve seal 16 is completely closed (i.e. not leaky), no significant fluid pressure exists in the chamber 26. Therefore, in the absence of fluid pressure in region 33 at the inlet side of the valve seal 16, the bias spring 35 biases the plunger 29 to a normal position. In the normal position the conic seal 30 and co-operating edge 32 form the fluid seal at the oulet port 28. If due to a brake application there is now a build-up of (braking) fluid pressure at the inlet side of the solenoid valve seal 16, there is also produced at the end of the plunger 29 a force which exceeds very quickly the force exerted at the other end of the plunger 29 by the bias spring 35. As a consequence, the plunger 29 is displaced from its normal position at a low brake pressure so that the outlet port 28 is unsealed. There is now a clear fluid path through the chamber 26 between the outlet side of the solenoid valve seal 16 and the connection 17 to allow fluid to be displaced from the brake 10 if the solenoid valve mechanism 5 is subsequently energized for an anti-lock operation. Due to the fact that there is a fluid pressure drop between the inlet side and the outlet side of the valve seal 16 when the solenoid valve mechanism 5 is energised, the fluid pressure at the end of the plunger 29 in bore 31 remains sufficiently high to maintain the plunger 29 displaced from its normal position, that is, the force at this end exceeds the force due to the bias spring 35 plus the force at the other end of the plunger 29 due to fluid pressure in the chamber 26, until a low value of braking pressure obtains. The respective areas at the ends of the plunger 29 and the strength of the bias spring 35 are selected having regard to the fluid pressure present in the system.

In the event of a prolonged energization of the solenoid valve mechanism 5, as would occur for anti-lock operation on a slippery road surface, the low value of braking pressure which might obtain during such an anti-lock operation might approximate to a value at which the pressure drop across the solenoid valve seal 16 is insufficient to maintain the plunger 29 displaced from its normal position. To guard against such a possibility either of the two modifications of FIGS. 2 and 3 may be employed. In FIG. 2, a damping valve 36 and a bias spring 37 therefor are provided at the end of the plunger 29 remote from the chamber 26. This damping valve 36 allows rapid displacement of the plunger 29 from its normal position when braking pressure initially builds-up, but when braking pressure is reduced to a low value (i.e. nearly to the value of fluid pressure in the reservoir 19) due to a prolonged energisation of the solenoid valve mechanism 5, the bias spring 35 becomes effective to cause a slow return of the plunger 29 towards its normal position by clamping the damping valve 36 against the shoulders in bore 31 so that fluid trapped between the end of the plunger 29 and damping valve 36 can only pass through a small orifice in the centre of damping valve 36. Alternately, as shown in FIG. 3, the magnetic circuit of the solenoid valve mechanism 5 can be extended such that the solenoid magnetic field has a leakage flux path 38 via the plunger 29. This would ensure that the plunger 29 is held displaced by magnetic attraction from its normal position until the solenoid valve mechanism 5 is de-energized at the end of an anti-lock operation. In this latter modification, it will be appreciated that such magnetic attractions must be sufficiently strong to displace the plunger 29 from its normal position, but must become effective only to maintain such displacement once the latter has been effected by the build-up of fluid pressure at the inlet side of the solenoid valve seal 16.

With regard to the fail-safe operation of the fail-safe arrangement 1, if due to a malfunction the solenoid valve mechanism 5 is already energized so that the valve seal 16 is fully open, or if the valve seal 16 is partially open due, say, to a piece of grit in its valve seat, there will be build-up of fluid pressure in the chamber 26 as soon as brake pressure is initially applied. If the valve seal 16 is fully open, the force due to the pressure-area product at the end of plunger 29 in the chamber 26 is greater than the force due to the pressure-area product at the other end in bore 31 so that the plunger 29 is not displaced from its normal position. Therefore, the outlet 28 remains sealed so that there can be a build-up of braking pressure. If the valve seal 16 is partially open sufficiently to permit, on brake application, an adequate build-up of fluid pressure in the chamber 26 then similar pressure-area product conditions obtain to hold the plunger 29 in its normal position. The fail-safe arrangement will not operate if a fluid leak at the valve seal 16 is insufficient to allow adequate pressure build-up in chamber 26. However, in this circumstance the solenoid valve mechanism 5 would itself "fail-safe" as described in commonly owned U.S. application Ser. No. 366,307 filed June 1, 1973.

It is to be appreciated that the pressure-area product conditions upon which the fail-safe arrangement 1 depends for its operation are made possible due to the fluid pressure conditions at the inlet and outlet sides of the solenoid valve seal 16. For normal operation in which the fail-safe arrangement 1 is inhibited as described above, the opening of the valve seal 16 for an anti-lock operation produces a pressure drop which is due to the rapid decreasing change of the braking pressure resulting from flow of displacement fluid through the opened valve seal 16. In contrast, for fail-safe operation of the fail-safe arrangement 1, the already opened valve seal 16 has no significant pressure drop produced across it due to the relatively slow increasing braking pressure at the start of a brake application.

What we claim is:

1. An anti-lock vehicle brake system of the type used with a vehicle wheel and an associated wheel brake including a fluid pressure sourse which in response to a braking action provides fluid under pressure by a fluid pressure connection to the brake, the fluid under pressure being effective to produce braking pressure at the brake to cause the latter to apply a braking force at the wheel, a solenoid anti-lock control valve having an inlet in fluid communication with the brake, wheel movement sensing means producing an output signal causing the anti-lock control valve to open when a predetermined relationship exists which signifies when wheel locking is imminent, and a relief connection in fluid communication with the brake and the outlet of the anti-lock control valve, opening of the anti-lock control valve reducing fluid pressure in said brake by allowing displacement of fluid away from the brake into the relief connection, the improvement which comprises in said relief connection at the outlet side of said anti-lock control valve a fail-safe arrangement for comparing the fluid pressure at the outlet side of the anti-lock control valve with the fluid pressure at the brake, said fail safe arrangement comprising:

a. means responsive to fluid flow at the outlet of the anti-lock control valve due to the anti-lock control valve being at least partially unsealed at the onset of brake pressure application when the anti-lock control valve is unactuated whereby there is pressure build-up at the outlet of said anti-lock control valve, the fail-safe arrangement sealing the outlet of the anti-lock control valve and b. if there is no fluid pressure build-up at the outlet of said anti-lock control valve at the onset of brake pressure application, said fail-safe arrangement being responsive to the fluid pressure at the brake to unseal said relief connection and thereafter maintain it unsealed notwithstanding subsequent build-up of fluid pressure at said outlet side due to actuation of the anti-lock control valve responsive to the wheel sensor.

2. A system as claimed in claim 1, wherein said fail-safe arrangement comprises, a chamber having an inlet port communicating with the outlet side of the anti-lock control valve and an outlet port communicating with the relief connection, a displaceable plunger or piston member having opposed surfaces thereof, respectively in fluid communication with the chamber and the brake, bias spring means for urging said piston member towards sealing engagement with said outlet port of the anti-lock control valve, said piston member being displaceable to seal said outlet port when the combined force acting thereon due to said bias spring means and fluid pressure in said chamber exceeds the force acting thereon due to fluid pressure of braking value, and being displaceable to open said outlet port when said latter force exceeds said combined force.

3. A system as claimed in claim 2, wherein said fail-safe arrangement further includes a damping member and an associated bias spring which act on the surface of said piston member that is in fluid communication with the brake and which are effective to slow down the displacement of said sealing member into sealing engagement with said outlet port by restricting the flow of fluid that surface when such displacement occurs.

4. A system as claimed in claim 2, wherein said fail-safe arrangement has a leakage flux path in the magnetic circuit of a solenoid valve mechanism which constitutes said anti-lock control valve, which leakage flux path includes sais piston member which on being displaced to open said outlet is held displaced by magnetic attractions during solenoid energisation so that subsequent displacement thereof to seal said outlet port, is inhibited until the solenoid valve mechanism is de-energized.

* * * * *

UNITED STATES PATENT AND TRADEMARK OFFICE
CERTIFICATE OF CORRECTION

PATENT NO. : 3,881,782
DATED : May 6, 1975
INVENTOR(S) : DEREK ROBERT SKOYLES

It is certified that error appears in the above-identified patent and that said Letters Patent are hereby corrected as shown below:

IN THE SPECIFICATION

Column 1, line 30, after "signifies" insert --when--;

line 36, after "causes" insert --a--;

Column 4, line 9, before "the pump 9" insert the following:

--Once the solenoid valve mechanism 5 is de-energized,--;

line 28, change "or" to --of--.

IN THE CLAIMS

Claim 1, line 2, after "brake" insert --and--;

Claim 4, line 8, after "valve" cancel the "," (comma).

Signed and Sealed this sixth Day of April 1976

[SEAL]

Attest:

RUTH C. MASON
Attesting Officer

C. MARSHALL DANN
Commissioner of Patents and Trademarks